(12) United States Patent
Sawant et al.

(10) Patent No.: US 12,044,420 B2
(45) Date of Patent: Jul. 23, 2024

(54) CONDENSER FAN OPERATION FOR HVAC SYSTEM

(71) Applicant: Johnson Controls Technology Company, Auburn Hills, MI (US)

(72) Inventors: Hambirarao S. Sawant, Pune (IN); Anthony J. Reardon, Norman, OK (US); Anand M. Dulange, Solapur (IN); Gregory Ulizio, Oklahoma City, OK (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 266 days.

(21) Appl. No.: 16/874,200

(22) Filed: May 14, 2020

(65) Prior Publication Data

US 2021/0356152 A1 Nov. 18, 2021

(51) Int. Cl.
| | |
|---|---|
| F24F 11/30 | (2018.01) |
| F24F 11/56 | (2018.01) |
| F24F 11/64 | (2018.01) |
| F24F 11/65 | (2018.01) |
| F24F 11/81 | (2018.01) |
| F24F 11/86 | (2018.01) |
| G05B 13/02 | (2006.01) |
| F24F 110/10 | (2018.01) |
| F24F 110/12 | (2018.01) |

(52) U.S. Cl.
CPC .............. *F24F 11/30* (2018.01); *F24F 11/56* (2018.01); *F24F 11/64* (2018.01); *F24F 11/65* (2018.01); *F24F 11/81* (2018.01); *F24F 11/86* (2018.01); *G05B 13/024* (2013.01); *F24F 2110/10* (2018.01); *F24F 2110/12* (2018.01)

(58) Field of Classification Search
CPC ....................................................... F24F 11/81
See application file for complete search history.

(56) References Cited

U.S. PATENT DOCUMENTS

| | | | | |
|---|---|---|---|---|
| 11,555,627 | B2* | 1/2023 | Speaker | F24F 11/86 |
| 2011/0083454 | A1* | 4/2011 | Kopko | F25B 49/027 |
| | | | | 62/181 |
| 2012/0111030 | A1* | 5/2012 | Fraser | F25B 49/027 |
| | | | | 62/190 |
| 2013/0019622 | A1* | 1/2013 | Nakashima | F25B 13/00 |
| | | | | 62/160 |
| 2013/0180267 | A1* | 7/2013 | Hartig | F25B 7/00 |
| | | | | 62/340 |
| 2015/0007596 | A1* | 1/2015 | Bean, Jr. | F25B 41/00 |
| | | | | 62/333 |
| 2015/0276299 | A1* | 10/2015 | Havard, Jr. | F24F 11/81 |
| | | | | 62/186 |
| 2018/0094827 | A1* | 4/2018 | Knight | F24F 11/30 |
| 2019/0178548 | A1* | 6/2019 | Lin | F25B 1/00 |

* cited by examiner

*Primary Examiner* — Nathan L Laughlin
(74) *Attorney, Agent, or Firm* — Fletcher Yoder, P.C.

(57) ABSTRACT

A heating, ventilation, and/or air conditioning (HVAC) system includes a plurality of condenser fans and a control system. The control system is configured to perform operations that include identifying an ambient condition, determining an operating mode of the HVAC system, and operating a subset of the plurality of condenser fans based on the operating mode and in response to identification of a low ambient condition.

20 Claims, 6 Drawing Sheets

CONDENSER FAN OPERATION FOR HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In some embodiments, the HVAC system may include a compressor configured to pressurize the refrigerant and circulate the refrigerant through the HVAC system. However, certain ambient conditions, such as low ambient conditions in which a temperature of ambient air is below a threshold temperature, may affect an operation of the HVAC system. For example, the low ambient condition may impact compressor performance during pressurization of the refrigerant.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a heating, ventilation, and/or air conditioning (HVAC) system includes a plurality of condenser fans and a control system. The control system is configured to perform operations that include identifying an ambient condition, determining an operating mode of the HVAC system, and operating a subset of the plurality of condenser fans based on the operating mode and in response to identification of a low ambient condition.

In an embodiment, a non-transitory computer-readable medium comprising computer-executable instructions that, when executed by processing circuitry, are configured to cause the processing circuitry to perform operations that include identifying an ambient condition, determining an operating mode of a compressor system of a heating, ventilation, and/or air conditioning (HVAC) system, and operating a subset of condenser fans of a plurality of condenser fans of the HVAC system based on the operating mode and in response to identification of a low ambient condition.

In an embodiment, a heating, ventilation, and/or air conditioning (HVAC) system includes a first condenser coil, a second condenser coil, and a compressor system comprising a first compressor and a second compressor. The first compressor is configured to direct refrigerant to the first condenser coil, and the second compressor is configured to direct refrigerant to the second condenser coil. The HVAC system further includes a plurality of fans that includes a first fan and a second fan. The first fan is an inner fan positioned proximate to the first condenser coil, and the second fan is an additional inner fan positioned proximate to the second condenser coil. The HVAC system also has a control system configured to perform operations that include identifying an ambient condition, determining an operation of the compressor system, and operating the first fan, the second fan, or both, based on the operation of the compressor system and the ambient condition.

DRAWINGS

Various aspects of this disclosure may be better understood upon reading the following detailed description and upon reference to the drawings in which.

Figure 6:
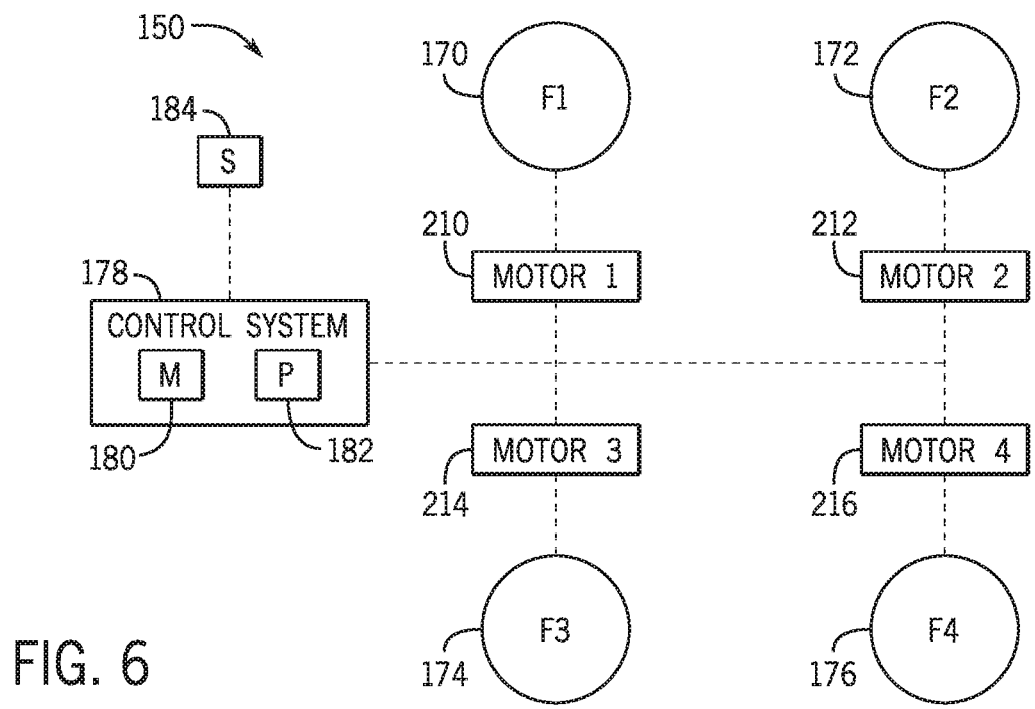
Figure 7:
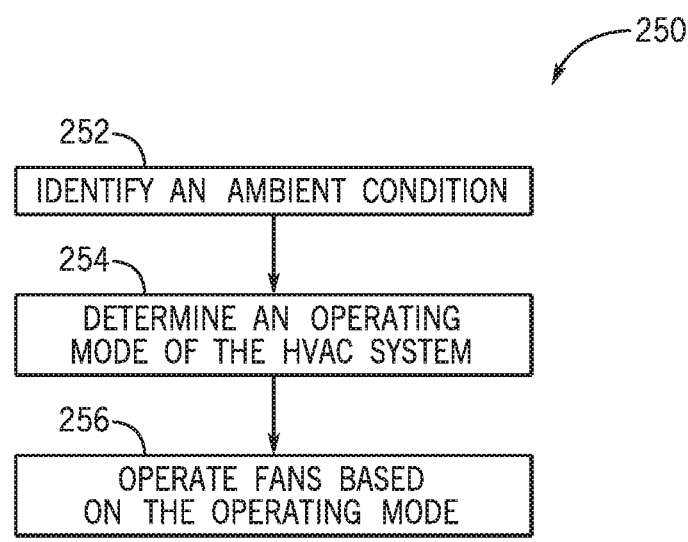

FIG. 6 is a schematic diagram of an embodiment of an HVAC system having condenser fans and a control system configured to control the condenser fans based on an ambient condition, in accordance with an aspect of the present disclosure; and FIG. 7 is a block diagram of an embodiment of a method or process for operating condenser fans of an HVAC system, in accordance with an aspect of the present disclosure.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may circulate a refrigerant through a refrigerant circuit and may place the refrigerant in a heat exchange relationship with a supply air flow in order to condition the supply air flow. For example, refrigerant circuit of the HVAC system may include a compressor or compressor system configured to pressurize the refrigerant, and the HVAC system may include a condenser or condenser system configured to cool the pressurized refrigerant. The cooled refrigerant may then be placed in a heat exchange relationship with the supply air flow, such as via an evaporator of the refrigerant circuit, to cool the supply air flow.

Unfortunately, in some circumstances, certain conditions of the refrigerant may affect the performance of the HVAC system, such as performance of the compressor. For instance, an operating parameter of the refrigerant, such as a suction temperature and/or a suction pressure, may be outside of a desirable or target range of values during a low ambient condition. For this reason, the compressor may operate outside of a compressor operating envelope that includes data points of operating parameter values at which operation of the compressor is desirable. For example, operation of the compressor within the operating envelope may reduce, limit, or mitigate stress induced in the compressor. However, when the compressor operates outside of the operating envelope, such as due to a condition of the refrigerant, the efficiency and/or structural integrity of the compressor may be impacted.

Thus, it is presently recognized that controlling the compressor to operate within the compressor operating envelope during low ambient conditions may improve operation of the compressor and therefore of the HVAC system. Accordingly, embodiments of the present disclosure are directed to controlling or adjusting an operating mode of the HVAC system in low ambient conditions (e.g., based on a low ambient condition). For example, the HVAC system may include multiple condenser fans configured to cool the refrigerant flowing through the condenser, and the HVAC system may operate a particular set or subset of the multiple condenser fans during a low ambient condition. That is, the HVAC system may operate fewer condenser fans during a low ambient condition as compared to during a normal or high ambient condition. In some embodiments, during normal or high ambient conditions, all condenser fans may be in operation. During a low ambient condition, operation of one or more condenser fans may be suspended or shut down. Thus, a subset of condenser fans may be in operation during a low ambient condition. The disclosed operation of condenser fans in low ambient conditions may enable the compressor to operate within the compressor operating envelope in the low ambient conditions, thereby improving the operation of the HVAC system.

Figure 1:
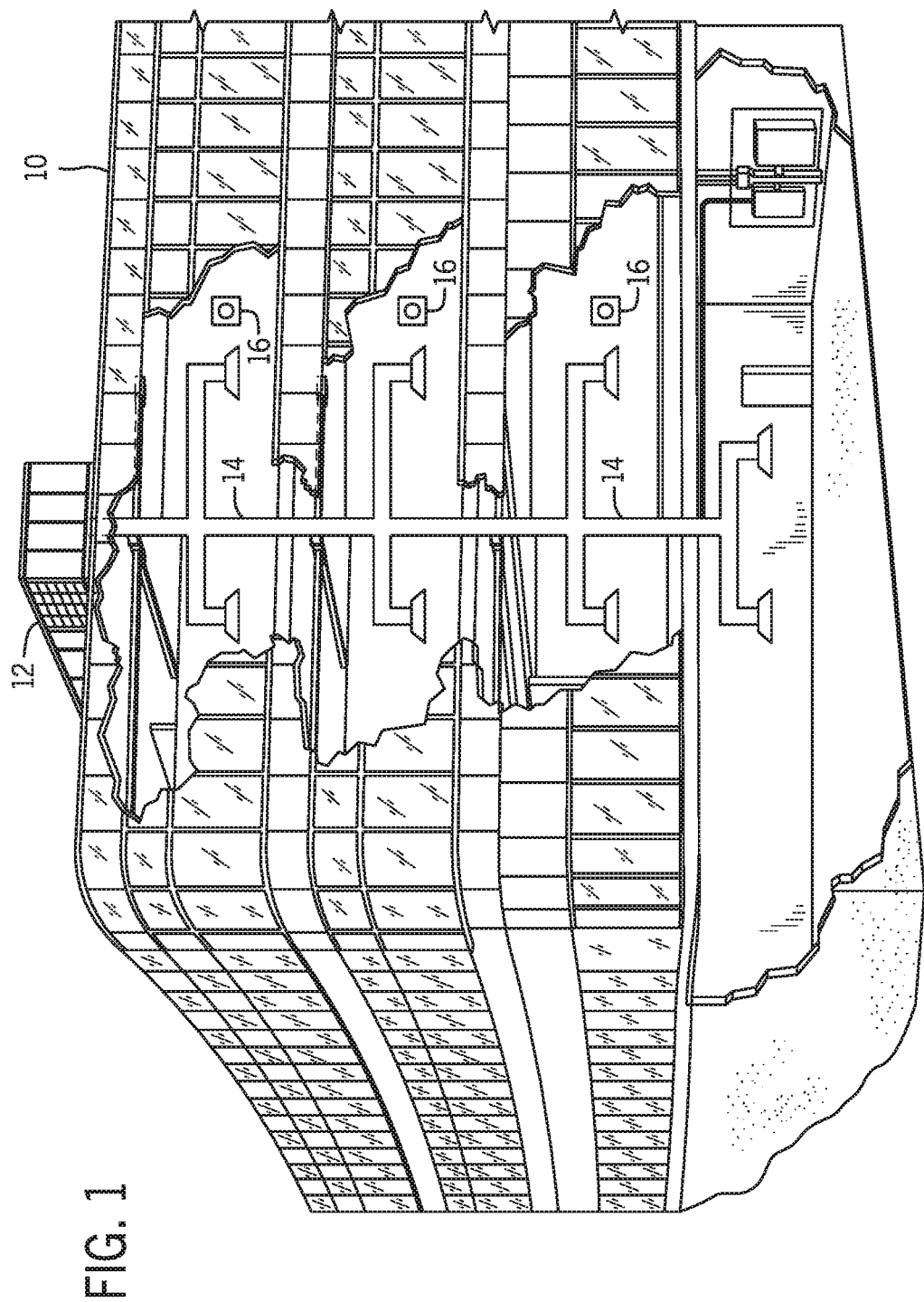
FIG. 1 is a perspective view of an embodiment of a heating, ventilation, and/or air conditioning (HVAC) system for environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
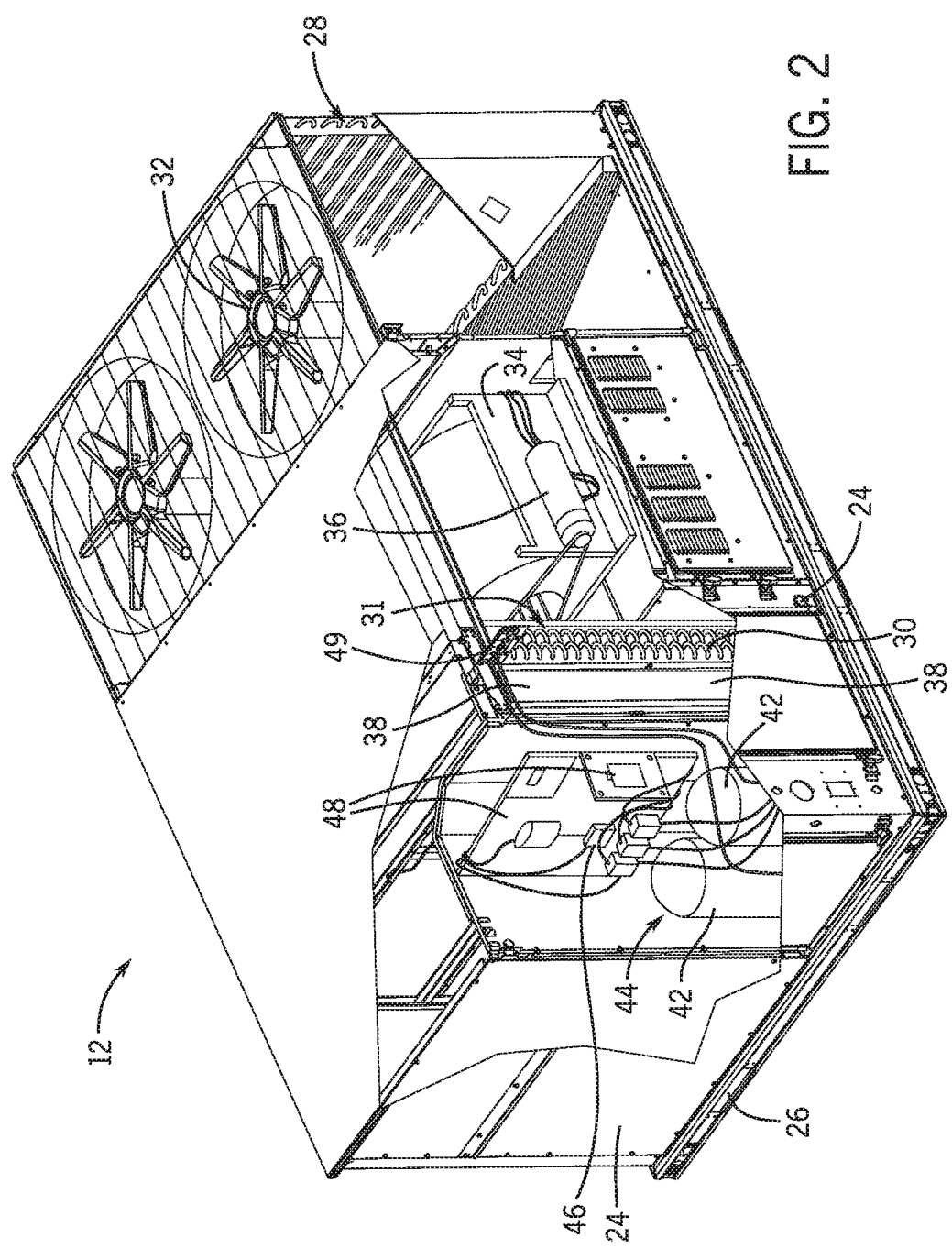
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
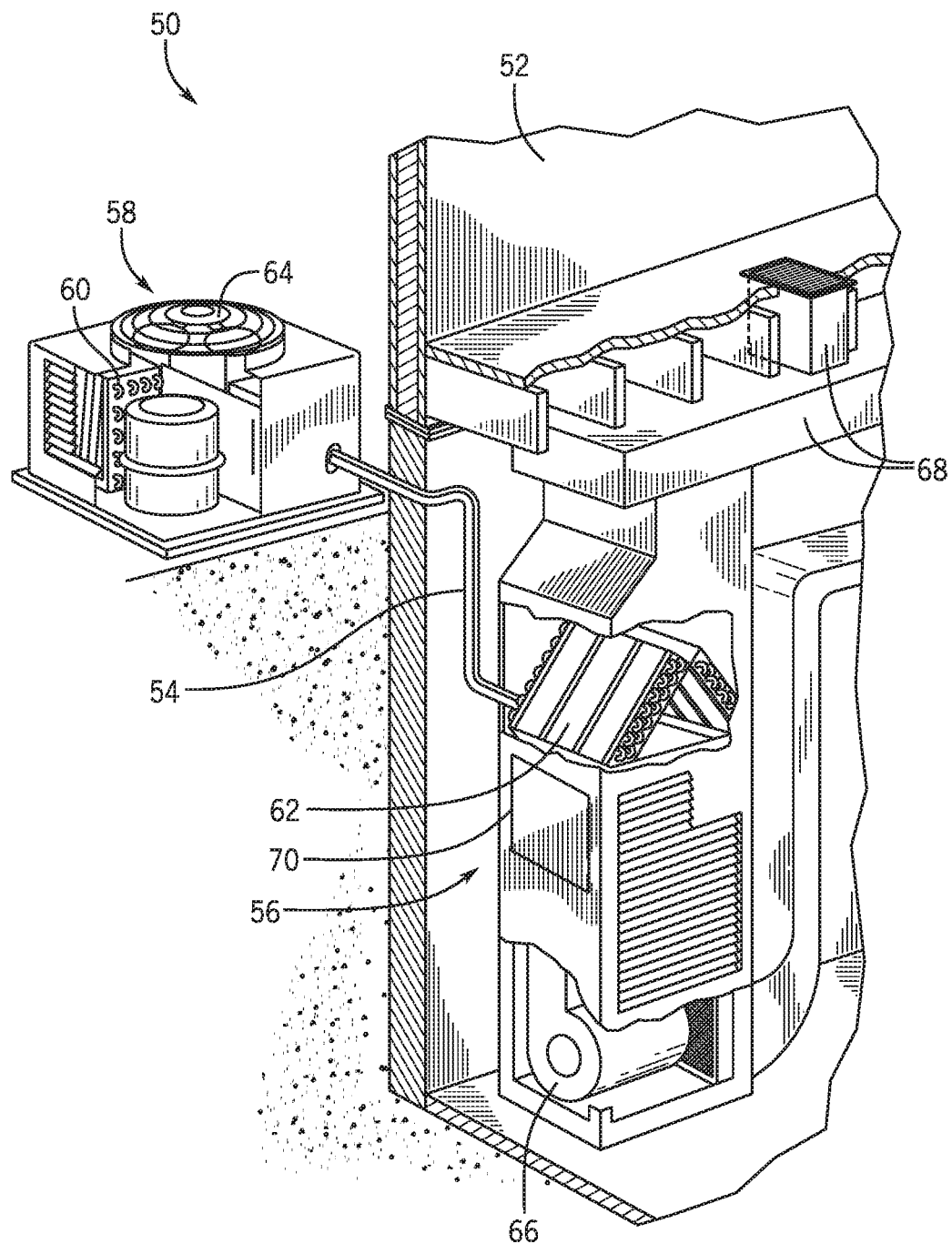
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
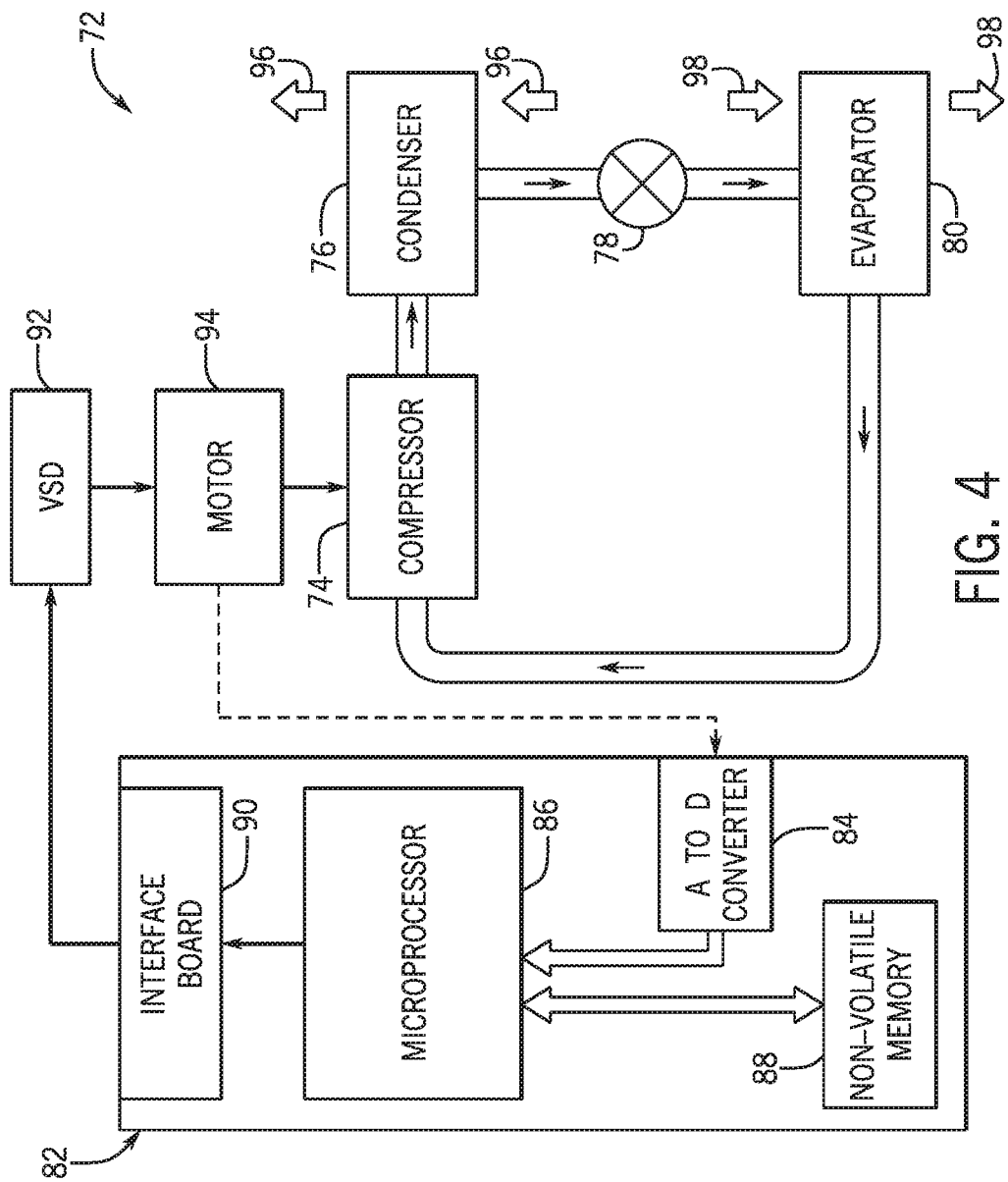
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, the present disclosure is directed to an HVAC system configured to operate in different operating modes. For example, the HVAC system may include a compressor system having multiple compressors that are each configured to pressurize a refrigerant directed through one or more refrigerant circuits. The HVAC system may also include a condenser system having multiple condenser fans that are each configured to cool the refrigerant pressurized by the compressor system by forcing an air flow across a condenser of the HVAC system. During a normal or high ambient condition, the HVAC system may operate in a first operating mode, in which all condenser fans of the condenser system are in operation. For example, in the first operating mode, the HVAC system may provide increased cooling of the refrigerant via operation of all of the condenser fans. During a low ambient condition, the HVAC system may operate in a second operating mode, in which a subset of condenser fans of the condenser system is in operation. In low ambient conditions, the reduced temperature of the ambient air may provide increased cooling of the refrigerant. As such, in the second operating mode, the HVAC system may operate fewer condenser fans and still achieve a desired amount of cooling, while causing the compressor to operate within a compressor operating envelope. Indeed, in some instances, operation of additional or all condenser fans in a low ambient condition may provide excessive cooling of the refrigerant, which may cause the compressor to operate outside of the compressor operating envelope.

In some embodiments, the particular subset of condenser fans in operation may be based on an operating mode of the compressor system, such as a number of compressors in operation. In any case, by reducing the number of condenser fans in operation during a low ambient condition, cost and/or energy consumption associated with operation of the HVAC system is reduced. Furthermore, such operation of the HVAC system in the first operating mode and the second operating mode may enable each compressor to operate within its respective compressor operating envelope, thereby maintaining a desired performance of the compressor system.

Figure 5:
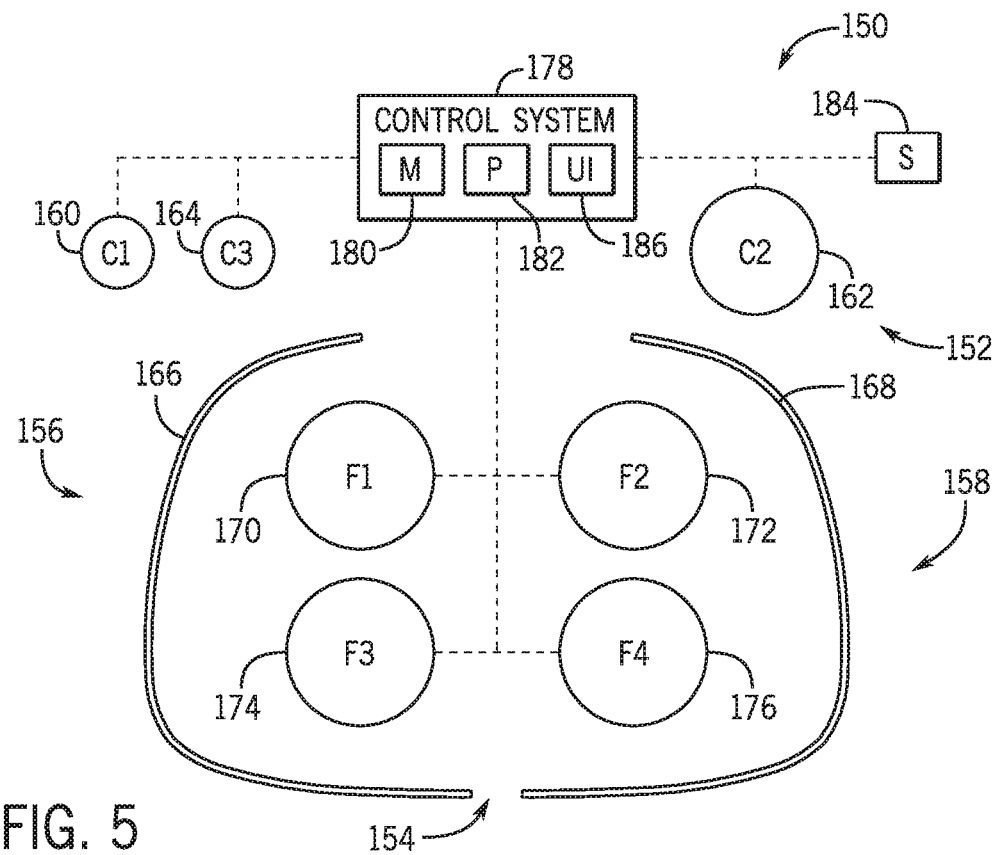
FIG. 5 is a schematic diagram of an embodiment of an HVAC system having a condenser system configured to operate in various operating modes based on an ambient condition, in accordance with an aspect of the present disclosure.

With this in mind, FIG. 5 is a schematic diagram of an embodiment of an HVAC system 150 having a compressor system 152 and a condenser system 154. The HVAC system 150 may be any type of HVAC system, such as an RTU (e.g., the HVAC unit 12), a split system (e.g., the residential heating and cooling system 50), or any other suitable type of HVAC system. The HVAC system may use a refrigerant to condition a supply air flow and then deliver the conditioned supply air flow to a space in order to condition the space, such as to cool and/or dehumidify the space.

In order to enable the refrigerant to condition the supply air flow, the compressor system 152 may be configured to pressurize the refrigerant flowing through a refrigerant circuit of the HVAC system 150, and the compressor system 152 may direct pressurized refrigerant, via the refrigerant circuit, to the condenser system 154 to cool the refrigerant via an air flow forced across the condenser system 154. In the illustrated embodiment, the HVAC system 150 includes a first refrigerant circuit 156 and a second refrigerant circuit 158. Each of the refrigerant circuits 156, 158 may direct a separate refrigerant therethrough. For example, the refrigerant circuits 156, 158 may condition the refrigerants independently of one another in order to provide more efficient and/or desirable cooling of the supply air flow.

In the illustrated embodiment, the compressor system 152 includes a first compressor 160 disposed along the first refrigerant circuit 156, a second compressor 162 disposed along the second refrigerant circuit 158, and a third compressor 164 disposed along the first refrigerant circuit 156. Further, the condenser system 154 includes a first condenser coil 166 disposed along the first refrigerant circuit 156 and a second condenser coil 168 disposed along the second refrigerant circuit 158. The first compressor 160 and the third compressor 164 may pressurize refrigerant of the first refrigerant circuit 156 (e.g., refrigerant received from an evaporator of the first refrigerant circuit 156) and direct the pressurized refrigerant to the first condenser coil 166. The first condenser coil 166 may then cool the pressurized refrigerant of the first refrigerant circuit 156. In addition, the second compressor 162 may pressurize refrigerant of the second refrigerant circuit 158 (e.g., refrigerant received from an evaporator of the second refrigerant circuit 158) and direct the pressurized refrigerant to the second condenser coil 168. The second condenser coil 168 may then cool the pressurized refrigerant of the second refrigerant circuit 158.

The HVAC system 150 may include multiple fans or condenser fans for cooling the respective refrigerants flowing through the first and second condenser coils 166, 168. As an example, a first fan 170, which may be a first inner fan, may be associated with (e.g., positioned proximate to) the first condenser coil 166. Thus, the first fan 170 is configured to force air flow primarily across the first condenser coil 166. However, as discussed further below, the first fan 170 may also induce an amount of air flow across the second condenser coil 168. As another example, a second fan 172, which may be a second inner fan, may be associated with (e.g., positioned proximate to) the second condenser coil 168 and therefore is configured to force air flow primarily across the second condenser coil 168. Furthermore, a third fan 174, which may be a first outer fan, may be associated with (e.g., positioned proximate to) the first condenser coil 166, and a fourth fan 176, which may be a second outer fan, may be associated with (e.g., positioned proximate to) the second condenser coil 168. As used herein, an "inner" fan may refer to a fan that is positioned adjacent to another section of a housing or unit of the HVAC system 150 (e.g., a section coupled to the condenser system 154 within the HVAC system 150). In other words, an "inner" fan is not a fan positioned closest to an edge or distal end of the housing or unit of the HVAC system 150 (e.g., the inner fan is positioned adjacent to an interior or medial section of the housing or unit). By contrast, an "outer" fan may refer to a fan that is positioned closest to an edge or distal end of the housing or unit of the HVAC system 150. Thus, an "inner" fan is positioned farther within the housing or unit of the HVAC system 150 relative to an "outer fan." As should be noted, "outer" fans that are positioned closest to an edge or distal end of the housing or unit of the HVAC system 150 may be exposed to increased ambient air flow compared to "inner" fans and therefore may be positioned more distal to another section of the housing or unit of the HVAC system 150.

The fans 170, 172, 174, 176 may direct air across the condenser coils 166, 168 in order to cool the respective refrigerants flowing through the condenser coils 166, 168 via convection (e.g., to an ambient environment). In some embodiments, the condenser coils 166, 168 may be shaped to cooperatively and substantially surround or enclose the fans 170, 172, 174, 176. By way of example, each of the condenser coils 166, 168 may have a U-shape. Such arrangement of the condenser coils 166, 168 and the fans 170, 172, 174, 176 may enable any one of the fans 170, 172, 174, 176 to direct air across both condenser coils 166, 168, thereby cooling both of the refrigerants flowing through the condenser coils 166, 168. That is, for instance, although the first fan 170 is positioned more proximate to the first condenser coil 166 than to the second condenser coil 168, operation of the first fan 170 may still draw or force air across the second condenser coil 168, thereby cooling the refrigerant flowing through the second condenser coil 168. As an example, a flow rate of the air flowing across the first condenser coil 166 and a flow rate of the air flowing across the second condenser coil 168 during operation of just the second fan 172 may be within a range of one another, such as within 3 percent of one another, within 5 percent of one another, within 10 percent of one another. Additionally or alternatively, the flow rate of the air flowing across the first condenser coil 166 and the flow rate of the air flowing across the second condenser coil 168 during operation of just the second fan 172 may cause be substantially different from one another (e.g., outside of the range from one another).

The HVAC system 150 may also include a control system 178 (e.g., the control panel 82) configured to control operation of various components of the HVAC system 150. The control system 178 may include a memory 180 and processing circuitry 182. The memory 180 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 150. The processing circuitry 182 may include one or more application specific integrated circuits (ASICs), one or more field programmable gate arrays (FPGAs), one or more general purpose processors, or any combination thereof, configured to execute the instructions stored in the memory 180 to operate the HVAC system 150. By way of example, the control system 178 may control operation of the fans 170, 172, 174, 176.

The control system 178 may operate the compressor system 152 in various operating modes. In some embodiments, each of the operating modes may include a different combination of compressors 160, 162, 164 in operation. As an example, the control system 178 may operate the compressor system 152 in a first operating mode, in which all compressors 160, 162, 164 are in operation. Moreover, the control system 178 may operate the compressor system 152 in a second operating mode, in which either the second compressor 162 is in operation and the first compressor 160 and the third compressor 164 are not in operation, or the first compressor 160 and the third compressor 164 are in operation and the second compressor 162 is not in operation. The control system 178 may be configured to operate the compressor system 152 based on an amount of conditioning (e.g., cooling) desired for the supply air flow. For instance, the first operating mode of the compressor system 152 enables increased cooling of the supply air flow, and the second operating mode of the compressor system 152 enables reduced cooling of the supply air flow. For this reason, the control system 178 may operate the compressor system 152 in a particular operating mode based on a target operating parameter (e.g., a target temperature) and/or a current operating parameter (e.g., a current temperature) of the supply air flow and/or of the space conditioned by the HVAC system 150.

In certain embodiments, the control system 178 may operate the fans 170, 172, 174, 176 independently of one another. That is, the control system 178 may selectively operate each of the fans 170, 172, 174, 176 regardless of the operating mode or state of the other of the fans 170, 172, 174, 176. As such, the control system 178 may control the cooling of the refrigerant more acutely. For instance, the control system 178 may operate the fans 170, 172, 174, 176 based on an ambient condition and/or a current operating mode of the compressor system 152. As an example, during a normal or high ambient condition, such as when a temperature of an ambient environment is above a threshold temperature (e.g., thirty degrees Celsius, forty degrees Celsius, forty five degrees Celsius), the control system 178 may operate all fans 170, 172, 174, 176 to provide increased cooling of the refrigerant in the condenser system 154. Such operation of the condenser system 154 during a normal ambient condition may enable each of the compressors 160, 162, 164 to operate in their respective compressor operating envelopes during the normal or high ambient condition.

In addition, during a low ambient condition, the control system 178 may suspend or shut down operation of certain fans 170, 172, 174, 176, thereby operating a subset of the fans 170, 172, 174, 176. In certain implementations, the subset of fans 170, 172, 174, 176 in operation may further be based on the operating mode of the compressor system 152. For example, during the low ambient condition and when the compressor system 152 is operating in the first operating mode (i.e., when all compressors 160, 162, 164 are in operation), the control system 178 may operate the first fan 170 and the second fan 172 while suspending or shutting down operation of the third fan 174 and the fourth fan 176. Thus, the condenser system 154 may accommodate (e.g., offset) the cooling effect of colder ambient air in the first operating mode during the low ambient condition, such as by avoiding overcooling of the refrigerant in the condenser system 154. Moreover, during a low ambient condition and when the compressor system 152 is operating in the second operating mode (i.e., when the second compressor 162 is active and the first compressor 160 and the third compressor 164 are not active or when the first compressor 160 and the third compressor 164 are active and the first compressor 160 is not active), the control system 178 may operate the second fan 172 while suspending or shutting down operation of the remaining fans 170, 174, 176. The condenser system 154 may accommodate (e.g., offset) the cooling effect of colder ambient air in the second operating mode during the low ambient condition, such as by avoiding overcooling of the refrigerant in the condenser system 154. Operation of the condenser system 154 based on the operation of the compressor system 152 may enable the compressors 160, 162, 164 to operate in the respective compressor operating envelopes during a low ambient condition.

For this reason, the control system 178 may identify or determine the operating mode of the compressor system 152 and whether a low ambient condition exists in order to determine or select the operation of the condenser system 154. To this end, the control system 178 may communicate with the compressor system 152 (e.g., with each of the compressors 160, 162, 164) so as to identify the operating mode of the compressor system 152. Furthermore, the control system 178 may be communicatively coupled to a sensor 184 of the HVAC system 150 to identify an ambient condition, such as whether there is a low ambient condition. That is, the sensor 184 may be configured to monitor an operating parameter indicative of the ambient condition. In an example, the operating parameter may be associated with an air flow, such as a temperature of ambient air, a humidity of ambient air, a temperature of the supply air flow, another operating parameter of any air flow, or any combination thereof. In another example, the operating parameter may include an operating parameter associated with the refrigerant, such as a suction temperature (e.g., a saturated suction temperature) of the refrigerant entering the compressor system 152 (e.g., any of the compressors 160, 162, 164), a suction pressure of the refrigerant entering the compressor system 152, a discharge temperature (e.g., a saturated discharge temperature) of the refrigerant exiting the compressor system 152, a discharge pressure of the refrigerant exiting the compressor system 152, another suitable operating parameter of the refrigerant, or any combination thereof.

In additional or alternative embodiments, the control system 178 may operate the HVAC system 150 based on a user input, such as a user input received via a user interface 186 (e.g., a thermostat). For instance, the user interface 186 may include a feature, such as a touchscreen, a button, a switch, a dial, and the like, with which a user (e.g., a resident, an operator, a technician) may interact in order to manually select an operating mode of the HVAC system 150, such as of the compressor system 152 and/or of the condenser system 154. As an example, the user may utilize the user interface 186 to input a request to operate the compressor system 152 in the first operating mode or in the second operating mode, and the control system 178 may then identify or determine the ambient condition in order to operate the condenser system 154 accordingly.

Further still, the control system 178 may operate the compressor system 152 and the condenser system 154 in different manners than described herein. By way of example, the control system 178 may operate a different combination of compressors 160, 162, 164 and fans 170, 172, 174, 176 in different operating modes and/or different ambient conditions. Such operations may be established during manufacture and/or development of the HVAC system 150, for example. By way of example, the respective sets of fans 170, 172, 174, 176 in operation during different ambient conditions and operating modes may enable the compressors 160, 162, 164 to operate in the respective compressor operating envelopes and may distribute air flow across each of the condenser coils 166, 168 in a desirable (e.g., more even) manner to cool the refrigerants.

Although FIG. 5 illustrates the HVAC system 150 as having three compressors 160, 164, 162, two condenser coils 166, 168, and four fans 170, 172, 174, 176, additional or alternative embodiments of the HVAC system 150 may have any suitable number (e.g., two, four, five or more) of compressors 160, 162, 164, any suitable number (e.g., one, three, four or more) of condenser coils 166, 168, and/or any suitable number (e.g., two, three, five or more) of fans 170, 172, 174, 176. Indeed, the HVAC system 150 may have any number of refrigerant circuits 156, 158 that each include a suitable number of compressors 160, 164, 162, condenser coils 166, 168, and/or fans 170, 172, 174, 176. In further embodiments, each of the compressors 160, 162, 164 may be configured to operate in different modes. For instance, the compressors 160, 162, 164 may operate at different frequencies, speeds, or capacities, and the different operating modes of the compressor system 152 may include different modes of the individual compressors 160, 162, 164. Moreover, the sizing of the components may be different in different embodiments of the HVAC system 150. In an example, in certain embodiments, each fan 170, 172, 174, 176 may be similar to one another, such as of a similar type, having a similar specification, of a similar embodiment, and/or having a similar operating parameter, thereby mitigating the purchase, manufacture, and/or installation of different fans, which may reduce costs associated with manufacture, operation, and/or maintenance of the HVAC system 150. However, additional or alternative HVAC systems 150 may include fans of different types, embodiments, and/or specifications. In the illustrated embodiment, the second compressor 162 of the HVAC system 150 may have a greater capacity than the first compressor 160 and/or the third compressor 164, and the first compressor 160 may have substantially the same capacity as the third compressor 164. In additional or alternative embodiments, the compressors 160, 162, 164 may be sized differently, such as to have substantially the same capacity or to have substantially different capacities from one another. In such embodiments, a different set of fans 170, 172, 174, 176 may be in operation than described herein in the different ambient conditions and operating modes.

FIG. 6 is a schematic diagram of an embodiment of the HVAC system 150 illustrating an arrangement of the fans 170, 172, 174, 176 of the HVAC system 150. In the illustrated embodiment, each fan 170, 172, 174, 176 may be operated via a respective motor communicatively coupled to the control system 178. That is, the control system 178 may output a respective control signal to a first motor 210 to operate the first fan 170, to a second motor 212 to operate the second fan 172, to a third motor 214 to operate the third fan 174, and to a fourth motor 216 to operate the fourth fan 176. Indeed, the control system 178 may output the respective control signals independently of one another in order to operate the motors 210, 212, 214, 216 and therefore the fans 170, 172, 174, 176 independently of one another.

In some embodiments, each fan 170, 172, 174, 176 is a single speed fan. That is, when in operation, each of the fans 170, 172, 174, 176 may be configured to rotate at a predetermined rotational speed, and the rotational speed of the fans 170, 172, 174, 176 may not be changed or varied from the predetermined rotational speed. Thus, each of the motors 210, 212, 214, 216 may be a single speed motor (e.g., a single phase motor), rather than a variable speed motor (e.g., a three phase motor). Further, wiring may directly connect the motors 210, 212, 214, 216 to the control system 178, rather than to sensors (e.g., the sensor 184) and/or to other components (e.g., a speed controller) to effectuate variable speed operation of the fans 170, 172, 174, 176, thereby reducing an amount and/or a complexity of wiring between components of the HVAC system 150. As such, implementing single speed fans may limit or reduce costs and/or complexity associated with operation and/or manufacture of the HVAC system 150. In additional or alternative embodiments, at least some of the fans 170, 172, 174, 176 may be a variable speed fan controllable by a variable speed drive, and the control system 178 may change the rotational speed of the fans 170, 172, 174, 176 in order to adjust the amount of cooling provided to the refrigerant flowing through the condenser system 154. That is, for instance, the control system 178 may select the rotational speed of the fans 170, 172, 174, 176 in order to maintain operation of the compressors 160, 162, 164 within the respective compressor operating envelopes.

FIG. 7 is a block diagram of an embodiment of a method or process 250 for operating the condenser system 154. In some embodiments, the method 250 may be performed by a control system, such as the control system 178. It should be noted that the method 250 may be performed differently than depicted in FIG. 7. For example, additional steps may be performed, and/or certain steps of the method 250 may be removed, modified, and/or performed in a different order.

At block 252, an ambient condition is identified. In particular, a determination may be made regarding whether a low ambient condition or a non-low ambient condition (e.g., a normal ambient condition, a high ambient condition) exists. In some embodiments, sensor data may be received and analyzed to determine the state or quality of an ambient condition. The sensor data may include an operating parameter or an operating parameter value, which may be indicative of a particular ambient condition. For instance, the operating parameter value may be compared with a threshold value to determine whether the operating parameter value is indicative of a low ambient condition. As an example, an ambient temperature below a threshold temperature value, a suction temperature below a threshold suction temperature value, a suction pressure below a threshold suction pressure value, a discharge temperature above a threshold discharge temperature value, a discharge pressure above a discharge pressure value, another suitable operating parameter value comparison, or any combination thereof, may be indicative of the low ambient condition.

At block 254, an operating mode of the HVAC system 150 may be determined. In certain embodiments, the operating mode corresponds to an operating mode of the compressor system 152, such as which of the compressors 160, 162, 164 is/are in operation to pressurize refrigerant. For example, the operating mode may be based on a desirable amount of conditioning to be provided by the HVAC system 150. In some implementations, the operating mode may be based on the ambient condition determined with respect to block 252. For instance, the ambient condition may affect a temperature of supply air flow to be conditioned and delivered by the HVAC system 150. Additionally or alternatively, the operating mode may be based on a target temperature or humidity of a space conditioned by the HVAC system 150, a current temperature or humidity of the space, a target temperature of the supply air flow, another suitable operating parameter, or any combination thereof.

In some embodiments, the compressor system 152 may be operated in a first operating mode that may provide increased cooling of the refrigerant, such as in response to an increased demand for cooling of the space. In the first operating mode, each compressor of the compressor system 152 (e.g., the compressors 160, 162, 164) may be in operation. The compressor system 152 may also be operated in a second operating that may provide reduced cooling of the refrigerant, such as in response to a reduced demand for cooling of the space. In the second operating mode, operation of at least one of the compressors of the compressor system 152 may be suspended or shut down. By way of example, in the second operating mode, the first compressor 160 and the third compressor 164 may be in operation (e.g., the operation of the second compressor 162 is suspended) or the second compressor 162 alone is in operation (e.g., operations of the first compressor 160 and the third compressor 164 are suspended). In certain implementations, the operating mode of the compressor system 152 may be based on communication with the compressors 160, 162, 164 indicative of which of the compressors 160, 162, 164 are active. Additionally or alternatively, the operating mode of the compressor system 152 may be based on sensor data indicative of a target amount of conditioning to be provided by the HVAC system 150, such as sensor data indicative of an operating parameter of the supply air flow and/or a condition of the space. In this way, determination of the operating mode may also be based on the sensor data.

At block 256, the fans 170, 172, 174, 176 are operated based on the ambient condition and the operating mode of the HVAC system 150. In particular, a subset of the fans 170, 172, 174, 176 are in operation and operation of a remainder of the fans 170, 172, 174, 176 may be suspended. Such operation of the fans may maintain desirable operation of the compressor system 152 (e.g., operation of the compressors 160, 162, 164 in the respective compressor operating envelopes) during any ambient condition. In some embodiments, during a non-low ambient condition, each of the fans 170, 172, 174, 176 may be in operation. In addition, during a low ambient condition, some the fans 170, 172, 174, 176 may be inactive. For example, in response to an identification of the low ambient condition and based on the compressor system 152 operating in the first operating mode, the first fan 170 and the second fan 172 may be active, and the third fan 174 and the fourth fan 176 may be inactive. Further, in response to an identification of the low ambient condition and based on the compressor system 152 operating in the second operating mode, the second fan 172 may be active, and the first fan 170, the third fan 174, and the fourth fan 176 may be inactive. In this manner, a predetermined combination or set of fans 170, 172, 174, 176 may be active for various ambient conditions and the operating modes of the HVAC system 150. Accordingly, the fans 170, 172, 174, 176 may not be dynamically operated (e.g., via operating speed adjustment) based on detected operating parameters of the HVAC system 150. For example, the operation of the fans 170, 172, 174, 176 may not be constantly adjusted or monitored (e.g., based on an operating parameter indicative of operation of the compressors 160, 162, 164 relative to compressor operating envelopes) in order to determine whether the fans 170, 172, 174, 176 are operating desirably.

Rather, the particular set of fans 170, 172, 174, 176 that are active in the different combination of ambient conditions and operating modes of the HVAC system 150 may be preset during development and/or manufacture of the HVAC system 150 and may be automatically implemented during operation of the HVAC system 150. As such, a complexity and/or a computing power associated with the operation of the HVAC system 150 may be limited and/or reduced.

The present disclosure may provide one or more technical effects useful in the operation of an HVAC system. For example, the HVAC system may include a compressor system configured to pressurize refrigerant and direct the pressurized refrigerant to a condenser system having multiple condenser fans that direct air across a condenser coil to cool the pressurized refrigerant. The HVAC system further includes a control system that controls operation of the condenser fans in order to maintain operation of the compressor system such as within a compressor operating envelope. In some embodiments, the control system may operate the condenser fans based on an ambient condition and an operating mode of the compressor system. By way of example, the control system may operate a set of the condenser fans and suspend operation of a remainder of the condenser fans. In other words, the combination of condenser fans that are active and inactive are based on the ambient condition and the operating mode of the compressor system. Such control of the condenser fans may improve operation of the compressor system and/or reduce energy consumption associated with operation of the HVAC system. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
 a plurality of condenser fans, wherein each condenser fan of the plurality of condenser fans is a single speed fan; and a control system configured to perform operations comprising:
- detecting an operating parameter value of the HVAC system indicative of a low ambient temperature condition;
- identifying the low ambient temperature condition based on a comparison of the operating parameter value to a threshold value;
- determining an operating mode of a compressor system of the HVAC system; and
- operating a subset of the plurality of condenser fans based on the operating mode and in response to identification of the low ambient temperature condition.

2. The HVAC system of claim 1, wherein the control system is configured to perform operations comprising operating a first subset of condenser fans of the plurality of condenser fans based on the compressor system operating in a first operating mode and in response to identification of the low ambient temperature condition, and operating a second subset of condenser fans of the plurality of condenser fans based on the compressor system operating in a second operating mode and in response to identification of the low ambient temperature condition.

3. The HVAC system of claim 2, comprising a first refrigerant circuit having a first condenser coil and a first compressor and comprising a second refrigerant circuit having a second condenser coil and a second compressor, wherein the plurality of condenser fans comprises a first condenser fan positioned proximate to the first condenser coil and a second condenser fan positioned proximate to the second condenser coil, and the control system is configured to perform operations comprising:
- operating the first condenser fan and the second condenser fan based on the compressor system operating in the first operating mode and in response to identification of the low ambient temperature condition, wherein the first operating mode comprises operation of the first compressor of the first refrigerant circuit and operation of the second compressor of the second refrigerant circuit; and
- operating the second condenser fan and suspending operation of the first condenser fan based on the compressor system operating in the second operating mode and in response to identification of the low ambient temperature condition, wherein the second operating mode comprises operation of the first compressor of the first refrigerant circuit and suspended operation of the second compressor of the second refrigerant circuit.

4. The HVAC system of claim 1, comprising a sensor communicatively coupled to the control system, wherein the sensor is configured to determine the operating parameter value of the HVAC system, wherein the operating parameter value comprises a temperature value of ambient air, a suction temperature value of a refrigerant circulated by the HVAC system, a suction pressure value of the refrigerant circulated by the HVAC system, a discharge pressure value of the refrigerant circulated by the HVAC system, or any combination thereof.

5. A non-transitory computer-readable medium comprising computer-executable instructions that, when executed by processing circuitry, are configured to cause the processing circuitry to perform operations comprising:
- detecting an operating parameter value of a heating, ventilation, and/or air conditioning (HVAC) system indicative of a low ambient temperature condition;
- identifying the low ambient temperature condition based on a comparison of the operating parameter value to a threshold value;
- determining an operating mode of a compressor system of the HVAC system; and
- operating a subset of condenser fans of a plurality of condenser fans of the HVAC system based on the operating mode and in response to identification of the low ambient temperature condition, wherein each condenser fan of the plurality of condenser fans is a single speed fan.

6. The non-transitory computer-readable medium of claim 5, wherein the low ambient temperature condition is a first ambient temperature condition, and wherein the computer-executable instructions, when executed by the processing circuitry, are configured to cause the processing circuitry to perform operations comprising operating each condenser fan of the plurality of condenser fans in response to identification of a second ambient temperature condition, wherein the second ambient temperature condition comprises an ambient temperature greater than a threshold temperature.

7. The non-transitory computer-readable medium of claim 5, wherein the computer-executable instructions, when executed by the processing circuitry, are configured to cause the processing circuitry to perform operations comprising operating the compressor system in a first operating mode or a second operating mode based on sensor data indicative of a target amount of conditioning to be provided by the HVAC system, wherein the first operating mode comprises operating a first compressor and a second compressor of a first refrigerant circuit and operating a third compressor of a second refrigerant circuit, and the second operating mode comprises operating the first compressor and the second compressor and suspending operation of the third compressor or operating the third compressor and suspending operation of the first compressor and the second compressor.

8. The non-transitory computer-readable medium of claim 7, wherein the low ambient temperature condition is a first ambient temperature condition, the first ambient temperature condition comprises an ambient temperature less than a threshold temperature, the plurality of condenser fans is disposed within a condenser section of the HVAC system, and the computer-executable instructions, when executed by the processing circuitry, are configured to cause the processing circuitry to perform operations comprising:
- operating a first condenser fan and a second condenser fan of the plurality of condenser fans based on the compressor system operating in the first operating mode and in response to identification of a second ambient temperature condition different from the first ambient temperature condition, wherein the first condenser fan is an inner fan positioned adjacent to an additional section of the HVAC system coupled to the condenser section, and the second condenser fan is an additional inner fan positioned adjacent to the additional section; and
- operating the first condenser fan and suspending operation of the second condenser fan based on the compressor system operating in the second operating mode and in response to identification of the first ambient temperature condition.

9. The non-transitory computer-readable medium of claim 8, wherein the computer-executable instructions, when executed by the processing circuitry, are configured to cause the processing circuitry to perform operations comprising suspending operation of a third condenser fan of the plurality of condenser fans in response to identification of the first ambient temperature condition, wherein the third condenser fan is an outer fan positioned distal to the additional section.

10. The HVAC system of claim 1, wherein the low ambient temperature condition comprises an ambient temperature less than a threshold temperature, and the operating parameter value comprises a temperature value of ambient air, a suction temperature value of a refrigerant circulated by the HVAC system, a suction pressure value of the refrigerant circulated by the HVAC system, a discharge pressure value of the refrigerant circulated by the HVAC system, or any combination thereof.

11. The HVAC system of claim 1, comprising:
a first refrigerant circuit comprising a first compressor of the compressor system; and
a second refrigerant circuit comprising a second compressor of the compressor system, wherein the control system is configured to operate a first condenser fan of the plurality of condenser fans and a second condenser fan of the plurality of condenser fans based on operation of the compressor system in a first operating mode and based on identification of the low ambient temperature condition, wherein the first operating mode comprises operation of the first compressor and operation of the second compressor.

12. The HVAC system of claim 11, wherein the control system is configured to operate the second condenser fan and suspend operation of the first condenser fan based on operation of the compressor system in a second operating mode and based on identification of the low ambient temperature condition, wherein the second operating mode comprises operation of the second compressor and suspended operation of the first compressor.

13. The HVAC system of claim 12, wherein the first refrigerant circuit comprises a first condenser coil fluidly coupled to the first compressor, the second refrigerant circuit comprises a second condenser coil fluidly coupled to the second compressor, the first condenser fan is positioned proximate to the first condenser coil, and the second condenser fan is positioned proximate to the second condenser coil.

14. A heating, ventilation, and/or air conditioning (HVAC) system, comprising:
a first condenser coil and a second condenser coil;
a compressor system comprising a first compressor and a second compressor, wherein the first compressor is configured to direct refrigerant to the first condenser coil, and the second compressor is configured to direct refrigerant to the second condenser coil;
a plurality of fans comprising a first fan, a second fan, a third fan, and a fourth fan, wherein the first fan is positioned proximate to the first condenser coil and adjacent to an interior section of a housing of the HVAC system, and the second fan is positioned proximate to the first condenser coil and adjacent to a distal end of the housing of the HVAC system; and
a control system configured to perform operations comprising:
identifying a low ambient temperature condition;
determining an operation of the compressor system; and
operating the first fan and suspending operation of the second fan based on the operation of the compressor system and in response to identification of the low ambient temperature condition.

15. The HVAC system of claim 14, wherein the control system is configured to perform operations comprising operating the first fan and suspending operation of the second fan, the third fan, and the fourth fan based on one of the first compressor or the second compressor being in operation, the other of the first compressor or the second compressor not being in operation, and in response to identification of the low ambient temperature condition, wherein the low ambient temperature condition comprises an ambient temperature less than a threshold temperature.

16. The HVAC system of claim 14, wherein the third fan is positioned proximate to the second condenser coil, the fourth fan is positioned proximate to the second condenser coil, the compressor system comprises a third compressor configured to direct refrigerant to the first condenser coil, and the control system is configured to perform operations comprising operating at least the first fan and the third fan based on the first compressor, the second compressor, and the third compressor being in operation.

17. The HVAC system of claim 14, wherein the first fan, the second fan, the third fan, and the fourth fan are single speed fans.

18. The HVAC system of claim 14, wherein the control system is configured to suspend operation of the second fan and the fourth fan in response to identification of the low ambient temperature condition, wherein the low ambient temperature condition comprises an ambient temperature less than a threshold temperature.

19. The HVAC system of claim 18, wherein the low ambient temperature condition is a first ambient condition, and the control system is configured to operate the first fan, the second fan, the third fan, and the fourth fan in response to identification of a second ambient temperature condition, wherein the second ambient temperature condition comprises the ambient temperature being greater than the threshold temperature.

20. The HVAC system of claim 19, wherein the third fan is positioned proximate to the second condenser coil and adjacent to the interior section of the housing, and the fourth fan is positioned proximate to the second condenser coil and adjacent to the distal end of the housing.

* * * * *